United States Patent Office 3,340,565
Patented Sept. 12, 1967

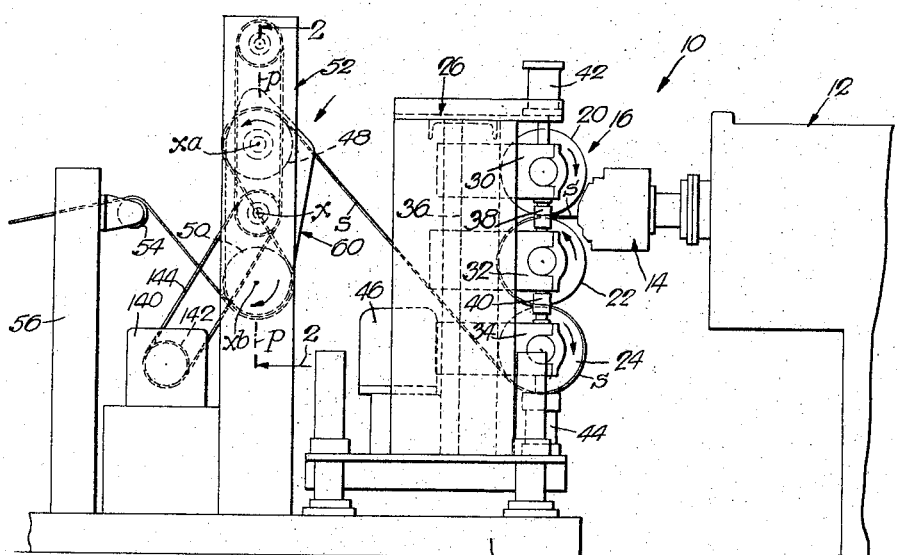

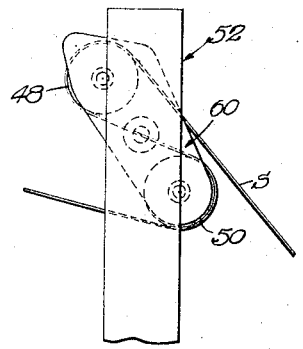
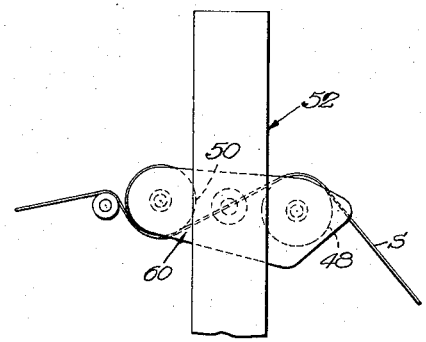
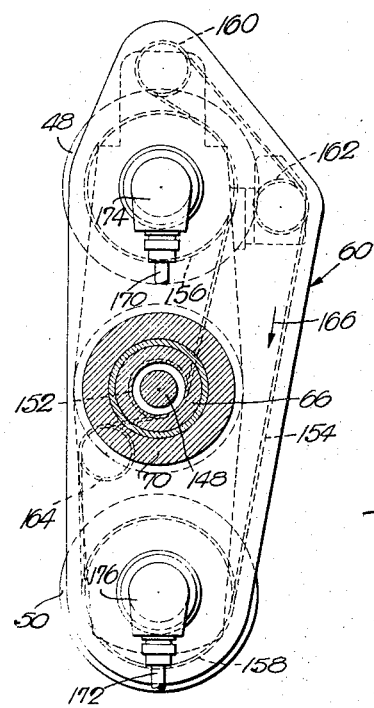
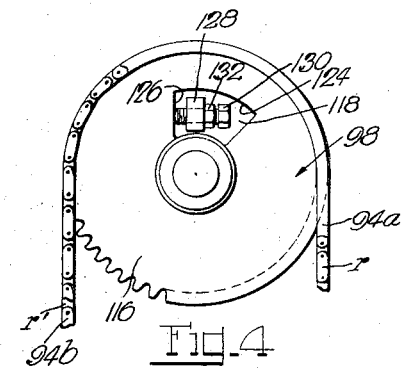
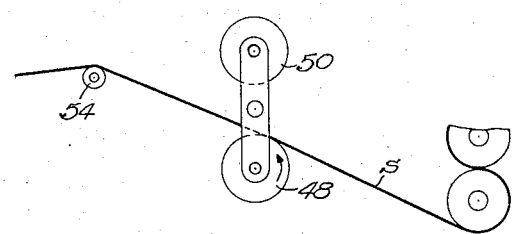
INVENTOR
Charles H. Holly

3,340,565
COOLING DEVICE FOR SOLIDIFICATION OF CONTINUOUSLY EXTRUDED THERMOPLASTIC STOCK
Charles H. Holly, Pawcatuck, Conn., assignor to Crompton & Knowles Corporation, Worcester, Mass., a corporation of Massachusetts
Filed Oct. 23, 1965, Ser. No. 502,971
1 Claim. (Cl. 18—1)

ABSTRACT OF THE DISCLOSURE

The disclosure deals with a post-cooling device for extruded plastic sheet having a pair of cooling rolls over which the sheet is led in partial peripheral wrap around the respective rolls, with the rolls being as a unit adjustable to vary the extent of the peripheral wrap around the rolls.

---

This invention relates to the setting of continuously extruded thermoplastic sheet stock in general, and to a stock cooling device for that purpose in particular.

In the production of flexible or semi-flexible plastic sheeting, it is customary to pass a sheet emerging from the extrusion die directly through pre-chill rolls and then over secondary or post-cooling rolls, of which the pre-chill rolls preset the sheet sufficiently to prevent self-deformation of the same and thus prepare it for its run over the secondary rolls which further set the sheet sufficiently for immediately following operations such as cutting it into lengths or winding it into rolls. While this procedure is entirely satisfactory for a given sheet extrusion operation, it is too inflexible for adaptation to the variable sheet extrusion operations of which existing extrusion apparatus are capable by adjustability or exchange of sheeting dies, variable temperature controls and the use of different plastics, for example. Thus, in subjecting a given extruded plastic sheet to the pre-chilling and post-cooling in an existing extrusion installation, the sheet may thus be cooled properly without adversely affecting its properties. However, if in the same extrusion installation with the same pre-chilling and post-cooling rolls other plastic sheeting is extruded, the same may well be overcooled in the post-cooling process through timewise excessive contact with the secondary cooling rolls, thereby giving rise to such deficiencies as molecular changes in the plastic adversely affecting its color, or causing it to crack or buckle, or shrink it too rapidly and thereby cause orientation which renders it unfit for various purposes such as reheating for further fabrication, for example. Accordingly, the post-cooling of extruded sheeting in existing extrusion installations is far too inflexible to cope with the potential variations in extruded sheeting within the capabilities of extrusion apparatus.

It is the primary aim and object of the present invention to provide for extrusion apparatus sheet-cooling equipment which is readily adpatable to any, and even the most widely variable, sheet extrusions without in any way adversely affecting the desired properties of the sheeting and its plastic.

It is another object of the present invention to provide for extrusion apparatus sheet-cooling equipment which includes the previous pre-chill rolls, and features a post-cooling provision which is widely variable in point of the time duration of its cooling action on continuously extruded and pre-chilled plastic sheeting, thereby to afford ready and accurate control over the extent of post-cooling of many different extruded sheets at which the latter retain all their desired properties.

It is a further object of the present invention to provide for extrusion apparatus sheet-cooling equipment of which the aforementioned post-cooling provision is in the form of driven cooling roll means, with the aforementioned timewise variable cooling action thereof on continuously extruded plastic sheeting being achieved by guiding the sheeting so as to pass over variable peripheral extents of the roll means.

Another object of the present invention is to provide for extrusion apparatus sheet-cooling equipment of which the aforementioned post-cooling provision involves two pairs of rolls, of which the rolls of a first pair serve to guide continuously extruded and pre-chilled sheeting led thereover in a straight path between them, and the rolls of the other pair are spaced and arranged between the rolls of the first pair and are cooling rolls over opposite sides of which the sheeting is passed in crossover fashion and thereby deflected from said straight path, with one pair of the rolls being turnable as a unit about an axis between the cooling rolls and adjustable in different angular positions to thereby vary the extent of peripheral wrap of the sheeting around the cooling rolls and, hence, the duration of contact of the sheeting with the cooling rolls, and the first three of the rolls following the pre-chill stage of the apparatus being driven at a peripheral speed substantially synchronous with the discharge speed of the sheeting from the pre-chill stage to avoid stretching of the sheeting in the process of its post-cooling.

A further object of the present invention is to provide for extrusion apparatus sheet-cooling equipment of which among the aforementioned pairs of rolls of the post-cooling provision the cooling rolls are preferably and advantageously the rolls which as a unit are turnable and adjustable in different angular positions.

It is another object of the present invention to provide for extrusion apparatus sheet-cooling equipment of which the aforementioned turnable unit of cooling rolls is adjustable for passage of the sheeting to varying different peripheral extents over both cooling rolls or over only one cooling roll, thereby considerably spreading the range within which sheeting may be post-cooled for variable time durations.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary side view of an extruder installation with sheet-cooling equipment embodying the present invention;

FIG. 2 is an enlarged fragmentary section through the sheet-cooling equipment taken substantially on the line 2—2 of FIG. 1;

FIG. 3 is a section taken on the line 3—3 of FIG. 2;

FIG. 4 is an enlarged view of a certain detail of the sheet-cooling equipment as viewed in the direction of the arrow 4 in FIG. 2;

FIGS. 5 and 6 are fragmentary side views of the sheet-cooling equipment in different operating positions; and FIG. 7 is a diagrammatic view of modified sheet-cooling equipment.

Referring to the drawings, and more particularly to FIG. 1 thereof, the reference numeral 10 designates an extrusion installation which comprises an extruder 12 with a die 14 for the extrusion of plastic sheet stock s, sheet pre-chill provisions 16 and sheet post-cooling provisions 18.

The sheet pre-chill provisions 16 comprise the customary pre-chill rolls 20 to 24 in an upright frame 26 on a base 28. The rolls 20 to 24 are journalled in bearing blocks 30 to 34 which are guided for vertical movement on bars 36. Block 32 with the intermediate roll 22 is in this instance fixed in position, while the other blocks 30 and 34 with the rolls 20 and 24 are vertically adjustable relative to the roll 22 for different thickness of the extruded sheet stock, with the adjustment of the blocks 30 and 34 being achieved by spindles 38 and 40 that are operated by motors 42 and 44, respectively. The pre-chill rolls 20 to 24 may be cooled by any circulating cooling medium, such as water, for example, passed to and from the individual rolls through suitable rotary fittings (not shown). The rolls 20 to 24 are operationally driven in the directions indicated by the arrows in FIG. 1, by a prime mover, preferably a variable-speed motor 46, and suitable driving connections (not shown) with the individual rolls.

The post-cooling provisions 18 comprise in this instance two rotary cooling rolls 48 and 50 in a standard 52 which in a manner described hereinafter are power-driven in the directions indicated by the arrows in FIG. 1.

In operation of the installation, plastic sheet stock $s$ is continuously extruded through the die 14 and passes into the bite of the driven pre-chill rolls 20, 22 and around the rolls 22 and 24 in the manner shown for its preset to an extent at which it is no longer self-deformable. The sheet stock $s$ then passes to the post-cooling device 18 where it is led first over the cooling roll 48 and then over the cooling roll 50 in the manner shown in FIG. 1 to thereby receive substantially its final set, with the sheet stock being then led off over a guide roll 54 on a suitable standard 56 from which it customarily passes onto a conveyor (not shown) for further operation such as cutting it into lengths or winding it into rolls. The extruded and thus set sheet stock $s$ is, of course, flexible or semi-flexible for its pass through the installation.

In accordance with the present invention, the post-cooling device 18 affords variable cooling of extruded sheet stock of most any thickness, including film thickness. To this end, the post-cooling rolls 48 and 50 are arranged turnably as a unit and adjustable in an infinite number of angular positions for variable wrap of sheet stock $s$ around the peripheries of these rolls. To this end, the rolls 48 and 50 are carried by a rotary turret 60 in the standard 52 (FIG. 2) which comprises arms 62 and 64 on opposite ends of the rolls 48 and 50, having journals 66 and 68 by means of which they are rotatably supported in coaxial hubs 70 and 72 on opposite sections 74 and 76 of the standard 52. The post-cooling rolls 48 and 50 are fast on shafts 78 and 80 which with their opposite ends are suitably journalled in the turret arms 62 and 64, as in bearings 82 and 84 in the arm 62, for example (FIG. 2). The turret arms 62 and 64 are preferably covered with sheet-metal shields 86 and 88, respectively.

The turret 60 is thus turnable about the axis $x$ which is parallel to the rotary axes of the individual post-cooling rolls 48, 50 and also parallel to the rotary axes of the individual pre-chill rolls 20 to 24 (FIG. 1). For adjustment of the turret 60 in an infinite number of angular positions about the axis $x$, the journals 66 and 68 of the turret arms 62 and 64 carry sprockets 90 and 92 which through chains 94 and 96 are connected with sprockets 98 and 100 on a cross-shaft 102 that is journalled in bearings 104 and 106 on the opposite sections 74 and 76 of the standard 52. Shaft 102 is at 108 coupled to the output shaft of a gear reducer 110 the input shaft 112 of which carries a handwheel 114. Thus, on turning the handwheel 114 the turret 60 will be turned about the axis $x$ into many different angular positions, including those shown in FIGS. 1, 5 and 6, with the gear reducer 110 including a self-locking worm and worm gear (not shown) to lock the turret 60 in any adjusted position despite operational torques thereon owing to the power-drive of the post-cooling rolls 48, 50 and the passage over the latter of pre-chilled sheet stock $s$.

To avoid rotational play of the turret in any angularly adjusted position, owing to slack in the chains 94 and 96, each of these chains is a double chain passing over relatively turnable sections 116, 118 and 120, 122 of the respective top sprockets 98 and 100 on the cross-shaft 102, with the sections of each of these sprockets being angularly adjustable relative to each other to eliminate operational slack in the chains 94 and 96. Thus, as shown in FIG. 4, the section 116 of the top sprocket 98 is provided with a recess 124 forming a shoulder 126, and the other sprocket section 118 is provided with a lug 128 that projects into the recess 124 and receives a screw 130 which on being tightened against the shoulder 126 relatively shifts the sprocket sections until the chain run $r$ of the one chain 94a and the opposite chain run $r'$ of the other chain 94b become taut between the lower sprocket 90 (FIG. 2) and the respective sprocket sections 116 and 118 of the upper sprocket 98 (FIG. 4) so that the slack in the double chain is operationally ineffective. After thus tightening the screw 130, the same is effectively locked by a nut 132. Slack in the other double chain is similarly rendered ineffective.

Since sheet stock $s$ passing over the post-cooling rolls 48, 50 crosses from one roll to the other roll in most adjusted positions of the turret 60 (FIGS. 1, 5 and 6), it stands to reason that the space between and over the axial extent of the rolls 48, 50 must be clear of any structure, and this explains the arm formation of the turret on opposite ends of the rolls 48, 50. The turret arms 62 and 64 are locked to each other against rotation relative to each other and for rotation as a unit only, by the roll shafts 78 and 80 by virtue of their journal bearings in the turret arms. However, the turret arms 62 and 64 are further locked against relative rotation by the chains 94 and 96 at all times, as will be readily understood.

For operational drive of the individual post-cooling rolls 48 and 50, there is provided a prime mover, such as a variable-speed motor 140 with a gear reducer the output shaft of which carries a sprocket 142 (FIG. 1) which through a chain 144 is connected with a sprocket 146 on one end of a shaft 148 which at 150 is journalled in the hollow journal 66 of the turret arm 62 (FIG. 2). Carried by the other end of shaft 148 is another sprocket 152 which through a chain 154 is connected with sprockets 156 and 158 on the roll shafts 78 and 80. As shown in FIGS. 2 and 3, the turret arm 62 also carries three idler sprockets 160, 162 and 164 over which the chain 154 passes. The chain 154 is thus passed over the sprockets 152, 156, 158, 160, 162 and 164 in the manner shown in FIG. 3, so that on the drive of sprocket 152 in an anti-clockwise direction and of the chain 154 in the direction of the arrow 166 (FIG. 3) the post-cooling rolls 48 and 50 will be driven in the correct directions indicated by the arrows in FIG. 1. Of course, the drive of these rolls 48, 50 is regulated so that their peripheral speed is substantially equal to the discharge rate of the sheet stock $s$ from the pre-chill rolls 20 to 24 so as to avoid any stretching of the pre-chilled sheet stock on its pass to the post-cooling rolls 48, 50.

The post-cooling rolls 48 and 50 may be cooled by a suitable circulating cooling medium, such as water, for example, which through flexible hoses 170, 172 and rotary fittings 174, 176 is led to and from the respective rolls 48 and 50 (FIGS. 2 and 3).

Preferably, the post-cooling rolls 48, 50 are of the same diameter and also axially coextensive (FIG. 2). Further, the rotary axes $xa$ and $xb$ of the rolls 48 and 50 lie in a plane $p$ in which the turret axis $x$ lies (FIG. 1), and they are preferably also equally spaced from the turret axis $x$.

FIGS. 1, 5 and 6 show various turret positions in which sheet stock $s$ wraps around the post-cooling rolls 48, 50. Thus, the exemplary adjustment of the turret 60 in FIG. 5 is near maximum wrap of the sheet stock $s$ around the rolls 48 and 50 for timewise near maximum duration of contact of the stock with the rolls, while at the exemplary adjustment of the turret in FIG. 1 the extent of wrap of the sheet stock around the rolls 48 and 50 is less and so is the duration of contact of the stock with the rolls. Finally, at the exemplary adjustment of the turret in FIG. 6, the extent of wrap of the sheet stock around the rolls 48, 50 is still less and so is the duration of contact of the stock with the rolls. It also follows from FIG. 6 that the wrap of the sheet stock around the rolls 48, 50 and, hence, the duration of contact between them may further be reduced on further clockwise adjustment of the turret 60 from the position in FIG. 6.

The range over which the wrap of sheet stock around the post-cooling rolls is variable may be further expanded by passing the sheet stock over the roll 48 only. Such an arrangement is illustrated diagrammatically in FIG. 7 in which the sheet stock s has the briefest contact with the roll 48 only.

While in the exemplary post-cooling device 18 there are provided preferably and advantageously two cooperating post-cooling rolls, it is, of course, fully within the purview of the present invention to provide only one post-cooling roll, such as the roll 48 in FIG. 7, for example, and eliminate the roll 50 in the same FIG. 7. With this modified arrangement, the range of variable wrap of sheet stock around only one roll is, of course, less than the range of variable wrap of sheet stock around two rolls, but this smaller range may be adequate for some applications. Also, while in the exemplary installation the turret 60 is turnable and adjustable in various angular positions, it is conceivable to hold the turret fixed and provide for turnability of the rolls 24 and 54 as a unit about the axis x and adjustability of the unit in various angular positions, to achieve variable wrap of the sheet stock around the post-cooling rolls.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

What is claimed is:

A post-cooling device for extruded plastic sheet, comprising spaced bearings with a common axis, two supports each having a journal member and a transverse arm on one end of said member, with said journal members being mounted in said bearings so that said arms are next to but spaced from each other, and said supports being independently turnable about said axis; a pair of spaced cooling rolls between said arms and journalled with their ends in said arms for rotation about second axes parallel to said common axis, with said journalled rolls solely joining said arms for rotation of said supports and rolls as a unit about said common axis; means to drive said rolls in opposite directions; and means for adjusting said unit in different angular positions which comprises an operating shaft member outside the rotary region of said unit and turnable about an axis parallel to said common axis, two chain drives between said shaft member and respective journal members, and means for turning said shaft member, with each of said chain drives providing two separate chains and sprocket means therefor on said shaft member and respective journal member, of which one of said sprocket means is in the form of two coaxial first and second sprockets, one for each chain, with said first sprocket being turnable with its respective member and said second sprocket being turnable relative to said first sprocket, and means for angularly adjusting said coaxial sprockets of each chain drive to tighten said chains and thereby also lock said supports and rolls in their unit-forming relation.

References Cited

UNITED STATES PATENTS

| 2,304,886 | 12/1942 | Conklin et al. | |
| 2,545,868 | 3/1951 | Bailey | 18—12 X |
| 3,116,787 | 1/1964 | Campbell. | |
| 3,243,844 | 4/1966 | Nash | 18—1 |

FOREIGN PATENTS 894,147 4/1962 Great Britain.

WILLIAM J. STEPHENSON, *Primary Examiner.*